United States Patent [19]
Walisser

[11] Patent Number: 5,296,584
[45] Date of Patent: Mar. 22, 1994

[54] RESOLE MELAMINE DISPERSIONS AS ADHESIVES

[75] Inventor: Wayne R. Walisser, Floyds Knobs, Ind.

[73] Assignee: Borden, Inc., Columbus, Ohio

[21] Appl. No.: 95,931

[22] Filed: Jul. 22, 1993

Related U.S. Application Data

[63] Continuation-in-part of Ser. No. 886,428, May 20, 1992, abandoned.

[51] Int. Cl.$^5$ .............. C08G 14/10; C08G 14/06; C08L 61/34
[52] U.S. Cl. .................. 528/163; 528/165; 528/232; 524/595; 524/596; 524/597; 524/598; 524/541; 524/841; 524/843; 525/480; 525/497; 525/504; 428/343; 428/355; 428/502; 428/506
[58] Field of Search ............. 524/594, 595, 596, 597, 524/598, 541, 841, 843; 528/163, 165, 232; 525/480, 497, 504; 428/343, 347, 355, 502, 506, 426

[56] References Cited

U.S. PATENT DOCUMENTS

| Re. 30,375 | 8/1980 | Deyzeman et al. | 525/497 |
| 2,315,400 | 3/1943 | D'Alelio | 528/163 |
| 4,757,108 | 7/1988 | Walisser | 524/496 |
| 4,785,073 | 11/1988 | Farkas et al. | 528/163 |
| 4,960,826 | 10/1990 | Walisser | 524/596 |

FOREIGN PATENT DOCUMENTS 6089555 7/1981 Japan.

Primary Examiner—Paul R. Michl
Assistant Examiner—Tae H. Yoon
Attorney, Agent, or Firm—Dennis H. Rainear; Kenneth P. Van Wyck

[57] ABSTRACT

The invention relates to a composition consisting of a melamine solid suspended or dispersed in a resole resin. The method of the invention favors the intermolecular condensation polymerization reaction between phenol and melamine, rather than homopolymerization between phenol molecules or between melamine molecules. This invention reduces formaldehyde emissions by favoring a reaction whose by-product is water rather than formaldehyde. The compositions are useful for bonding glass fiber mats used for thermal and acoustical insulation.

22 Claims, No Drawings

RESOLE MELAMINE DISPERSIONS AS ADHESIVES

FIELD OF THE INVENTION

This is a continuation-in-part of Ser. No. 886,428 filed May 20, 1992, now abandoned.

This invention relates to the preparation of dispersions of melamine in phenolic resole resins which are useful as adhesives in the preparation of, for example, glass fiber thermal insulation, glass fiber acoustical insulation, glass fiber molded products (automotive roof and hood liners) and uncured glass wool. The suspensions also provide useful polymer matrices for glass fiber and other synthetic fiber reinforced structural composites.

BACKGROUND

High water solubility is a key feature of prior art glass fiber bonding resins used in the preparation of resinated glass wool. High water solubility is normally provided by formulating these resins (e.g., phenol/formaldehyde-resole resins or melamine/formaldehyde resins) with high formaldehyde to phenol molar ratios or with high formaldehyde to melamine molar ratios (near or above 3:1 in either case). Reaction products are respectively monomeric methylol phenols and methylol melamines. The methylol melamines are normally stabilized by further reaction with methanol to form the water soluble methoxy methyl melamine derivatives.

A high content of unreacted formaldehyde is therefore often found in prior art resins of these types as a consequence of the high formaldehyde ratios employed to prepare them.

Application of heat to thermally set (polymerize) these types of conventional resole resins in curing operations also causes the release of additional amounts of formaldehyde from condensing methylol groups in the resole resins and from condensing methoxy methyl groups in the melamine resins.

The release of irritating formaldehyde gas from resin impregnated, also called resinated, glass wool or glass fabrics during molding and shaping operations may be objectionable both from an environmental, and industrial hygienic point of view.

Formaldehyde release during curing of the resin is also a problem with the well-documented use of mixtures of these two types of resins. It has therefore been necessary and common industrial practice to control formaldehyde evolution into the environment and work place during curing and B-staging operations, by compounding these methylol phenol and methoxy methyl melamine binders, or mixtures of the two, with significant amounts of urea and/or ammonia. Urea and ammonia have very high reactivities towards free or uncombined formaldehyde and readily affect its capture from aqueous A-stage solution compositions. The products from such scavenging reactions are dissolved methylol urea monomers and hexamine (also called hexamethylenetetramine), respectively. Mixtures containing methylol ureas may still be problematic, however, as the thermally-induced condensation reaction between methylol ureas also releases formaldehyde.

Additionally the use of urea and particularly ammonia as formaldehyde scavengers results in the formation and release of undesirable trimethyl amine through various, thermally-induced decomposition reactions. The formation of trimethyl amine from ammonia and formaldehyde is a well-documented reaction. Trimethyl amine, although possibly not as volatile or irritating as formaldehyde, does have an objectionable, foul smelling "fishy" odor. Trimethyl amine also has a low human threshold odor limit in the low parts per billion range.

The trimethylamine problem is particularly pronounced in high density molded articles prepared with high binder contents as the curing operation traps evolved gasses inside the mold, and subsequently inside the glass fiber resin matrix, which gives the finished article a long-lasting unpleasant trimethylamine odor. Less dense articles, such as residential thermal insulation that are cured by blowing heated air through the resinated glass wool blanket, may have less odor in the finished article. The escaping trimethylamine gas purged from the curing blanket by the hot air flow nonetheless ends up in the environment. The use of urea and/or ammonia to scavenge or capture formaldehyde in these binders therefore may not satisfy environmental restrictions on fiberglass plants and the increasing quality (odor free) standards for finished products.

These decomposition reactions occur as a result of the inherent thermal instability of urea and its reaction products with formaldehyde and the very high curing temperatures employed; (often above 500° F.) to mold or permanently shape resinated glass wool.

Another objectionable problem with binders and resinated wool containing urea is their propensity to burn, blacken and smoke during 500° F. molding operations. Urea has, in fact, been added to prior art binders as an antipunk agent to reduce thermal oxidative degradation.

A need therefore exists in the art for phenolic binder compositions that cure above 500° F. without the liberation of offensive odors, smoke or other volatile organic pollutants.

The art has previously recognized the outstanding high temperature and antipunk properties of binders prepared from melamine added to a phenolic resole. All known prior art binders, however, which specify compositions containing melamine use either a high formaldehyde containing-resole where a methylol melamine derivative is formed, or the melamine has been added to the phenol as a methoxy methyl melamine derivative. These approaches have provided dissolved melamine resin solutions or water soluble melamine-containing binders. The prior art often uses the term "melamine" to include both melamine per se and also derivatized melamine, such as methylol melamine. Thus, herein the term "melamine crystal" means melamine, per se, and underivatized in powder, crystalline, or flake form. This shall include, for example, and not by way of limitation, MCI's GP (General Purpose), non-recrystallized grade of melamine powder. Melamine crystal herein shall also mean 1,3,5-triazine-2,4,6-triamine; 2,4,6-triamino-S-triazine; and cyanurotriamide.

U.S. Pat. No. 4,960,826, issued Oct. 2, 1990 to Walisser, teaches binder compositions comprising resole resins copolymerized with melamine. The materials of U.S. Pat. No. 4,960,826 are prepared by mixing the alkaline high formaldehyde containing resole and melamine preferably at elevated temperatures and resulted in dissolving all of the melamine in the resin (column 11, line 4). This produced a clear very high solids resin solution as a one-piece binder system, which however suffered from pre-cure, or advancing of the resin during application. A dispersion was not taught in U.S. Pat. No. 4,960,826.

U.S. Pat. No. 4,757,108, issued Jul. 12, 1988 to Walisser, teaches binder compositions comprising resole resins reacted with urea. The resulting resin solution was clear with no undissolved components, and did not utilize melamine.

The teachings of Deuzeman U.S. Pat. No. Re. 30,375 fundamentally advance the concept of a high formaldehyde ratio to achieve high phenol conversions. This results, however, in finished products with, for the purpose of the current invention, undesirably high levels of free or uncombined formaldehyde.

U.S. Pat. No. 4,785,073, issued Nov. 15, 1988 to Farkas, et al., teaches melamine-phenol-formaldehyde resole modified compositions. The compositions of Farkas, et al., however, are produced using mildly alkaline conditions at pH 7.2 to 8.5, unlike the strongly alkaline compositions of the present invention. Furthermore, Farkas, et al. requires the presence of a glycol or glycol derivative unlike the present invention.

SUMMARY OF THE INVENTION

This invention provides a composition comprising free melamine crystal suspended or dispersed in a resole resin. This type of uncured, unreacted, A-stage, water soluble composition is prepared by dispersing rather than dissolving and reacting any suitably ground melamine crystal or powder in an alkaline resole with a low formaldehyde:phenol ratio and a high base or alkali:-phenol ratio, and providing acidic conditions therefor. By "alkaline resole" herein shall mean a resole with a pH which is basic, above 7.0, and not limited to a resole using an alkali salt or metal ion. "Alkali" herein shall mean any pH basic material. Also included herein are very low solids melamine crystal resole resin water solutions in which the melamine crystal is initially and temporarily dissolved, but then recrystallized as a particulate suspension in the resole when the solvent water is evaporated. Without requiring further "cooking" or conditioning as conventionally used to produce a B-staged composition, the unreacted, uncured dispersions or suspensions of melamine crystal solids formed in the present invention after removal of any solvents are useful bonding adhesives with such glass fiber matrix compositions as may be found in many different thermal and acoustical insulation products. The low level of volatile by-products or unreacted reactants and the high temperature performance characteristics of the A-stage compositions of the present invention also make the unreacted, uncured dispersion or suspension a suitable polymeric binder matrix for the glass, carbon or synthetic fiber type prepregs now being widely used to produce molded structural composites particularly in the aerospace industry.

The unreacted, uncured, A-stage dispersions of the present invention can be applied to a glass mat by driving off any liquid carrier such as organic solvent or water, to produce a dry or high solids dispersion on the mat. The dispersion can then be heat cured during which the melamine is solubilized in the resole, the components react, and crosslinking results in amino methyl linkages. Thus, one important and novel aspect of the present invention is the ready solubility of the added melamine crystal solids in the resole solid when subsequently heated and melted. The water solubility of the uncured compositions of the present invention is greatly increased relative to prior art compositions, such as those of Farkas, et al., because the prior art compositions are cooked or reacted resulting in minimal water solubility. In addition, Farkas, et al. requires the use of glycols which are not part of the present invention. In molding and curing operations, the glass wool or synthetic fiber having on its surface the dried dispersion of melamine crystal in the resole resin of the present invention, is molded or shaped into a finished article at high temperatures while the melamine crystal is dissolving, reacting and crosslinking in the resole melt to effect cure. This novel process reduces formaldehyde emissions.

The ready solubility of the melamine crystal in the heated resole melt may be appreciated in consideration of the solubility of melamine in hot ethylene glycol, glycerol and triethanolamine solvents, which are solvents similar to the resole with respect to its high methylol ($-CH_2OH$) functionality.

The very rapid solubilization in the present invention of melamine crystal in a low formaldehyde-containing acidified resole melt may, in fact, be observed by depositing a 50% solids, pH 5.0, aqueous resole melamine crystal dispersion on a 155° C. hot plate. The milky film initially observed after the solvents flash off, visually clarifies in about 10 seconds, as the melamine crystal is solubilized in the resole.

An additional and important aspect of the present invention is further considered to be the direct reaction of the free and underivatized amino groups of melamine with the methylol groups of methylol phenol in the hot and acidic B-staged resole melt during the curing and molding. The reaction is believed to be an acid catalyzed condensation reaction that eliminates only water and not formaldehyde to form amino methyl ($-NHCH_2-$) linkages between the phenolic and triazine rings.

The acidic condition of the resole resin prepared herein using low levels of HCHO and high levels of alkali or other base causes the resin to subsequently undergo, during molding and curing, a crosslinking reaction with melamine crystal. The unreacted melamine crystal dispersed in the resole resin is solubilized in the molten resin during the cure and molding step. Once solubilized, heated, and having been acidified, the melamine crystal then reacts through its amino groups with the methylol groups on the phenol to form amino methyl linkages. Because the total formaldehyde content in the resole preparation of the present invention is kept lower than that in conventional resole resin preparations, there is little or no free formaldehyde to form methylol melamine or methoxy methyl melamine as used in the prior art. The problem of formaldehyde evolution from condensing methylol phenols, methylol ureas, methylol melamines or condensing methoxy methyl melamines is thus further reduced by the present invention.

Melamine to phenol methylene bridging achieved by the present invention thus replaces or substantially replaces the conventional phenol to phenol methylene bridging and melamine to melamine methylene bridging (homopolymer formation) in prior art mixtures of resoles with melamine. This is evidenced by the yellow-colored resole resin binder of the present invention compared to the red-colored prior art resole resin melamine resin binders. This color distinction clearly denotes the novelty of the invention over the art. In comparison with prior art methods of preparing resole resins using methylol melamine or methoxy methyl melamine resins, the method of this invention thus provides an opportunity for improved co-condensation between phenol or methylol phenol and melamine because by the present invention the melamine is not cooked or pre-reacted with the resole or derivatized and the underivatized melamine cannot condense with itself to form a methylol melamine resin or a methoxy methyl melamine resin.

The uncured water soluble composition produced by the present invention thus provides a convenient and less expensive (the cost of melamine crystal is currently about one-half the cost of methoxy methyl melamine on a solids basis) and more environmentally desirable route to the synthesis of resole melamine binders. The high temperature performance properties of fiber composite articles made therefrom equal or exceed those of conventional articles.

Another important distinction of the present invention over the prior art using melamine to modify resoles is the absence in the present invention of an initial reaction in the A-stage composition between methylol phenol and melamine. Such reaction occurs only during heated molding and curing, rather than on mixing, where melamine is often dissolved through reaction with the free formaldehyde in the resole to form the more soluble methylol melamines.

According to the process of the present invention, the uncured, unreacted resole melamine crystal suspensions, also referred to herein as dispersions, may be applied with any suitably acidic catalyst directly to a substrate such as, for example, spun glass fibers, through, for example, conventional air atomization nozzles or spinning disc atomization equipment. In cases where a water soluble resole resin has been employed, the resin may be diluted with large quantities of water. The water may be heated to increase the melamine crystal solubility in the diluted binder. Such dilution will produce complete solubilization of the melamine crystal to form a water-clear melamine resole binder solution that may be acidified and applied through conventional, fine tipped, high pressure liquid spray nozzles to flame attenuated glass fibers with fiber collection and evaporation of the water. After evaporation of the water, the melamine concentration rises in the binder above its solubility level and forms or reforms a dispersion by recrystallizing on the substrate. In this manner is formed a glass wool blanket or other substrate on which is located the uncured, unreacted molten resin dispersion of melamine crystal in the resole resin binder of the present invention. Additionally, the binder comprising the melamine resole resin dispersion may be impregnated directly into woven or non-woven glass, carbon, or aramid fiber cloths to form, after solvent or water removal, the high resin solids prepregs used to produce structural composites. The molten dispersion can be allowed to cool and solidify on the substrate. The impregnated glass wool blanket or fabric is then molded under conditions sufficient to cause the resin binder to flow and cure as described above.

DESCRIPTION OF THE PREFERRED EMBODIMENTS

The present invention relates to a water soluble A-stage, unreacted, uncured but curable composition consisting of:

(a) an alkaline phenolic resole resin having a formaldehyde to phenol mole ratio of from 0.5:1 to 3.5:1 and a base catalyst to phenol mole ratio of from 0.01:1 to 1:1;

(b) melamine crystal dispersed in the resole resin, wherein the melamine crystal to phenol mole ratio is from 0.01:1 to 1.0:1.0; and (c) an acid selected from the group consisting of oxalic acid, sulfamic acid, nitric acid, and methane sulfonic acid, in an amount sufficient to catalyze the polymerization reaction of said resin with the melamine crystal upon exposure to elevated temperatures, neutralize the base and drop the pH of the dispersion to a level of from 2.5 to about 5.5; wherein the dispersion produced is a water soluble curable A-stage composition.

The present invention further relates to a method of preparing a water soluble, A-stage, unreacted, uncured but curable composition, said method consisting of:

(a) preparing an alkaline resole resin composition by combining formaldehyde and phenol at a formaldehyde to phenol mole ratio of from about 0.5:1 to 3.5:1 in the presence of a basic catalyst, wherein the catalyst to phenol mole ratio is from about 0.01:1 to 1:1;

(b) dispersing in said resole resin a quantity of melamine crystal, wherein the melamine crystal to phenol mole ratio is from 0.01:1 to 1:1; and (c) adding to the dispersion of step (b) an acid selected from the group consisting of oxalic acid, sulfamic acid, nitric acid, and methane sulfonic acid in an amount sufficient to drop the pH to a level of from 2.5 to 5.5, wherein the temperature is not sufficient to dissolve the melamine or to initiate any polymerization between the melamine and the resole.

The curable melamine crystal suspensions in resole resins of the current invention may be prepared from any one of the wide variety of commercially available aqueous or solvent-based phenolic resole resins. Liquid or solid phenolic resole resins, or mixtures thereof, are operative herein, with liquid resins being preferred. Specially prepared, low-formaldehyde containing resole resins may, however, be used most advantageously to produce subject resole melamine crystal suspensions that have exceptionally low volatile emissions properties. Resole resins of this type are preferably formulated with unconventionally low formaldehyde to phenol mole ratios in the range of from about 0.5:1 to 3.5:1 and more desirably from about 1.0:1 to 3.0:1. Also useful herein are melamine to phenol mole ratios of 0.01:1 to 1.0:1, with preferred mole ratios in the range of about 0.20:1 to about 0.75:1. A melamine level of about 15 weight percent of total solids is preferred herein.

The resole resins of the present invention are further preferably formulated herein with a pH of 8.0 or above via unconventionally high ratios of basic catalyst (such as NaOH or hexamine) to phenol mole ratios in the range of from about 0.01:1 to about 1.0:1. The preferred base to phenol mole ratio is about 0.1:1 to 0.3:1. A preferred level of base catalyst in the present invention is relatively large, for example 18–20 mole percent based on phenol. It has been found that relatively high levels of alkali catalyst are useful to effect a very high degree of phenol conversion to methylol phenols with a low molar ratio of formaldehyde. The result is an aqueous resin solution with relatively low levels of free monomers (both formaldehyde and phenol) and relatively high levels of methylolated phenol, such high levels being particularly suitable for the subsequent acid catalyzed reaction with melamine. The reaction products are relatively high solids at this point but retain for some uses the desired water solubility characteristics of the methylol phenol resin components in an acidic binder solution as indicated by Example 1, below.

The resole resins of the current invention show a high level of phenol conversion to methylol phenol with much lower formaldehyde to phenol mole ratios than those resole resins advanced by Deuzeman, thereby giving molded products made from the resins that also have very low levels of free or uncombined formaldehyde. The high levels of conversion of phenol to resin is promoted by the relatively high levels of alkali catalyst compared to conventional alkaline catalyst levels.

A-stage unreacted, uncured but curable compositions of the current invention are thus readily prepared by dispersing any suitably ground melamine crystal powder in the cooled, low free formaldehyde-containing resole prepared using high levels of alkali catalyst. MCI's GP (General Purpose) non-recrystallized grade of melamine powder is preferred.

Phenolic solids to melamine crystal solids weight ratios of about 95:5 to 65:35 are preferred. It has been observed that clear films of the molten B-staged resole melamine dispersion do not form at 155° C. (some melamine remains undissolved) when levels of melamine crystal above about 35 wgt % are used.

It has also been found that curing of resole melamine crystal dispersions which are pH neutral or mildly alkaline does not appear to produce preferred melamine phenolic co-polymer formation, as evidenced by the higher formaldehyde emissions from subsequent curing, and by the red coloration of the cured binder and molded articles made therefrom. By the present invention, in fact, the red coloration caused by methylolphenol condensation is avoided and instead a yellow color is produced indicative of the amino-methyl phenolic material produced.

It has therefore been found advantageous to acidify the dispersions of the present invention, to a moderately low pH in the range from about 2.5 to 5.5 with any suitable acid. The lower the pH, the more melamine-phenol condensation is achieved as opposed to phenol-phenol or methylol phenol condensation. The very low pH, (pH below about 2.0) acid catalyzed condensation of methylol phenol is avoided.

It has further been found that multivalent acids such as sulfuric acid or phosphoric acid are less preferred for the acidification of a diluted binder since these acids severely reduce the solubility of melamine crystal in water. These types of acids may also be precluded from the B-staged resole melamine dispersions as it is expected their presence would also limit melamine solubility in the resole melt. Strong carboxylic acids, such as oxalic acid, may be employed.

Strongly acidic monovalent and low molecular weight acids such as sulfamic, nitric, or methane sulfonic are preferred acids. An acid with a low molecular weight is preferred because of the presence in the resole resins of the present invention of a large amount of alkali. This alkali, used as a catalyst to polymerize or cure the resole resin, requires neutralization, and in order to minimize dilution of the final C-stage polymer matrix with non-polymer forming ingredients (acid-base salts) that might otherwise reduce the strength and temperature performance properties of the cured composition, a low molecular weight acid is preferred. Sulfamic acid is most preferred.

EXAMPLE 1

Resole Preparation

An alkaline resole was prepared by mixing the following components at 50° C. in the listed proportions (parts by weight):

| | |
|---|---|
| phenol | 100.0 |
| formaldehyde (50% Aqueous) | 140.4 |
| sodium hydroxide (50% Aqueous) | 16.0 |
| water | 25.0 |

The mixture was then conditioned with removal of heat of reaction at 50° C. for 2 hours and then at 57° C. for 4.5 hours with further removal of heat to give a resole resin solution with the following properties:

| | |
|---|---|
| % free formaldehyde | 1.5 |
| % free phenol | 2.5 |
| % oven solids | 50.5 |
| Refractive index | 1.4860 |
| Acid dilutability, NTU's (Turbidity in an aqueous pH 4, 20:1 dilution) | 2 |
| pH | 9.4 |

EXAMPLE 2

Resole Melamine Dispersion

To 550 pounds of resole resin solution from Example 1 was added 50 pounds of MCI's super fine grind melamine crystal powder, to provide a resole melamine crystal dispersion with a solids weight ratio of 85 resole solids:15 melamine solids and a melamine crystal:phenol mole ratio of 0.187:1. A homogeneous suspension existed after about 20 minutes agitation. The final temperature was 10° C. The suspension was then added to 12,000 pounds of 80° F. water. A clear solution formed after about 15 minutes agitation indicating complete dissolution of the melamine crystal.

Fifty pounds of solid sulfamic acid crystal was then added. After an additional 10 minutes of agitation, the pH had been reduced to about 5.46. The resulting clear binder solution was then applied to glass fibers as described earlier to remove water and produce a glass wool blanket upon which was deposited a resole binder containing dispersed melamine crystals.

EXAMPLE 3

Fifty pounds of MCI's unground melamine crystal was added to 4,000 pounds of 175° F. water. A clear solution formed after 10 minutes of agitation. 8,000 pounds of 45° F. water were then added along with 550 pounds of resin from Example 1 and 50 pounds of solid sulfamic acid to give an 84° F. water clear binder with a stable pH of 5.50 and a melamine crystal:phenol mole ratio of 0.187:1. This binder was then applied to glass fibers as described above to remove the water and produce a glass wool blanket containing a melamine crystal dispersion in resole resin upon the glass wool.

EXAMPLE 4

Same as example 3 except the solid sulfamic acid amount added was increased from 50 pounds to 68 pounds to give a stable binder solution pH of 4.50 and melamine:phenol mole ratio of 0.187:1. This resin solution was then applied to glass fibers as described above to remove the water and produce a glass wool blanket containing a dried melamine crystal dispersion in resole resin upon the glass wool.

EXAMPLE 5

Same as Example 3 except the solid sulfamic acid amount added was reduced from 50 pounds to 41 pounds to give a stable binder solution pH of 6.47 which was then applied to produce the resinated glass wool blanket.

EXAMPLE 6

Resinated wool from Examples 2, 3, 4, and 5 was molded at about 500° F. into automotive headliners. The molding can be at a temperature of from 350° to 550° F. The headliners produced from each example were found to meet or exceed all of the automotive industry physical strength and performance standards for this product.

Additionally, the headliners were found to be completely free of any foul smelling "fishy" type odors frequently found with conventional urea or ammonia containing phenol-formaldehyde binders. In particular, a General Motors test (GM 9209-P) for residual trimethyl amine in the headliner indicated no detectable amine for each example above.

EXAMPLE 7

Headliners from Examples 3, 4 and 5 were additionally tested for residual levels of free formaldehyde using the test procedure of Borden Industrial Resins Division Test Report No. 1200. The following results were obtained:

|  | Example 3 | Example 4 | Example 5 |
|---|---|---|---|
| Binder pH | 5.5 | 4.5 | 6.5 |
| Formaldehyde emitted from headliner test pieces (concentration in test water, ppm) | 13.0 | 6.4 | 20.2 |

As this example shows, the increased level of sulfamic acid in Example 4 resulted in a 50% reduction in the level of formaldehyde detected in the test water relative to Example 3 and even greater reduction relative to Example 5.

EXAMPLE 8

500 pounds of resole resin solution from Example 1 were added to 12,000 pounds of 84° F. water. Sixty-five pounds of melamine crystal were then added to provide a phenolic solids to melamine solids weight ratio of 79.5:20.5. The melamine-phenol mole ratio was 0.273:1. After 15 minutes agitation, 50 pounds of solid sulfamic acid crystal was then added. After an additional 15 minutes agitation a clear binder solution was obtained with a stable pH of 5.49. The binder solution was then applied to glass fiber to produce a resinated glass wool blanket.

EXAMPLE 9

Resinated wool from Example 8 was molded at a temperature of 500° F. into automotive headliners that meet or exceed current automotive industry performance standards for this product.

EXAMPLE 10

To 100 grams of resole resin solution from Example 1 was added 8.9 grams of melamine crystal, 871 grams distilled water and 44.7 grams of 19% sulfamic acid. A clear binder solution was produced with a pH of 5.0. 10 mls of this solution was poured into a 10 cm watch glass and allowed to evaporate over 22 hours at room temperature. A turbid resin film containing dispersed melamine solids was produced on the surface of the watch glass.

EXAMPLE 11

A resole resin was prepared by mixing the following components at 40° C. in the listed proportions (by weight):

| phenol | 100.0 |
|---|---|
| paraformaldehyde (92% flake) | 35.2 |
| hexamine (45% aqueous) | 4.4 | and the mixture then conditioned for 100 minutes at 80° C. with removal of water of condensation and heat of reaction to give a high solids resole resin product with the following properties:

| % free formaldehyde | 2.0 |
|---|---|
| % free phenol | 22 |
| % oven solids | 79.5 |
| pH | 8.1 |
| Viscosity, cps (25° C.) | 12,500 |

This resin was prepared using hexamine as the base catalyst. Such a resin product is useful for forming structural parts.

EXAMPLE 12

To 55 pounds of resole resin from Example 11 were added with good agitation 3.8 pounds of MCI's super fine grind melamine powder to provide a phenolic solids to melamine solids weight ratio of 92:8 and a melamine to phenol mole ratio of 0.068:1. 1.6 pounds of methanol solvent was added to thin the resin viscosity to about 5,150 cps. The resulting resole melamine suspension can be used without any further dilution to impregnate layers of woven and non-woven glass fabrics which are then molded at high temperature into structural shapes with good strength properties and no emissions.

Although the invention has been described in conjunction with preferred embodiments, it is to be understood that many alternatives, modifications, and variations will be apparent to those skilled in the art in light of the foregoing description. Accordingly, this invention is intended to embrace all such alternatives, modifications, and variations which fall within the spirit and scope of the appended claims.

That which is claimed is:

1. A water soluble, A-stage, unreacted, uncured but curable composition consisting of:
   (a) an alkaline phenolic resole resin having a formaldehyde to phenol mole ratio of from 0.5:1 to 3.5:1 and a base catalyst to phenol mole ratio of from 0.01:1 to 1:1;
   (b) melamine crystal dispersed in the resole resin, wherein the melamine crystal to phenol mole ratio is from 0.01:1 to 1.0:1.0; and
   (c) an acid selected from the group consisting of oxalic acid, sulfamic acid, nitric acid, and methane sulfonic acid, in an amount sufficient to catalyze the polymerization reaction of said resin with the melamine crystal upon subsequent exposure to elevated temperatures, neutralize the base and drop the pH of the dispersion to a level of from 2.5 to about 5.5; and wherein the dispersion produced is a water soluble, curable, A-stage composition.

2. The composition of claim 1 wherein the formaldehyde to phenol mole ratio is from 1.0:1 to 3.0:1.

3. The composition of claim 1 wherein the base catalyst is sodium hydroxide and is present in the resole of step (a) at a level of about 8 weight percent based on phenol.

4. The composition of claim 1 wherein the dispersion is first dissolved in water, then recrystallized in water to form a dispersion.

5. The composition of claim 1 wherein the melamine to phenol mole ratio is from 0.20:1 to about 0.75:1.

6. The composition of claim 1 wherein the acid is oxalic or sulfamic acid.

7. The composition of claim 1 wherein the acid is sulfamic acid and the pH in step (c) is about 4.5.

8. The composition of claim 1 wherein the elevated temperature is about 350° to 550° F.

9. A substrate bearing on its surface the curable composition of claim 1.

10. The substrate of claim 9 wherein the substrate is a glass fiber mat.

11. The composition of claim 1 which is essentially free of methylol melamine.

12. The composition of claim 1 which is essentially free of methoxy methyl melamine.

13. The composition of claim 1 which eliminates water and not formaldehyde upon polymerization of step (c).

14. The composition of claim 1 wherein the resole exhibits 200 to 600 ppm unreacted phenol.

15. The composition of claim 1 which exhibits 2 to 15 ppm formaldehyde.

16. The composition of claim 1 which is yellow colored.

17. The composition of claim 1 wherein the base catalyst is present at a level of from 18 to 20 mole percent based on the phenol content in the composition.

18. The composition of claim 1, wherein the pH in step (c) is 5.0 to 5.5, any liquid and volatile components have been removed, and a dry, solid composition is provided.

19. The composition of claim 1 wherein the phenolic to melamine crystal ratio on a solids weight ratio is from about 95:5 to 65:35.

20. The composition of claim 1 wherein the base catalyst is selected from alkali metals, salts thereof and hexamine in an amount sufficient to provide the alkaline resole.

21. A method of preparing a water-soluble curable composition consisting of the steps of:
  (a) preparing an alkaline resole resin composition by combining formaldehyde and phenol at a formaldehyde to phenol mole ratio of from about 0.5:1 to 3.5:1 in the presence of a basic catalyst, wherein the catalyst to phenol mole ratio is from about 0.01:1 to 1:1;
  (b) dispersing in said resole resin a quantity of melamine crystal, wherein the melamine crystal to phenol mole ratio is from 0.01:1 to 1:1; and
  (c) adding to the dispersion of step (b) an acid selected from the group consisting of oxalic acid, sulfamic acid, nitric acid, and methane sulfonic acid in an amount sufficient to drop the pH to a level of from 2.5 to 5.5, wherein the temperature is not sufficient to dissolve the melamine or to initiate any polymerization between the melamine and the resole.

22. The method of claim 21 wherein the pH in step (c) is from 5.0 to 5.5.

* * * * *